US012665955B2

(12) United States Patent
Bhat et al.

(10) Patent No.: US 12,665,955 B2
(45) Date of Patent: Jun. 23, 2026

(54) GATEWAY SERVICE DRIVEN DOWNSTREAM ORCHESTRATION

(71) Applicant: PayPal, Inc., San Jose, CA (US)

(72) Inventors: Rajendra Bhat, Bangalore (IN); Prabin Patodia, Bangalore (IN)

(73) Assignee: PayPal, Inc., San Jose, CA (US)

( * ) Notice: Subject to any disclaimer, the term of this patent is extended or adjusted under 35 U.S.C. 154(b) by 110 days.

(21) Appl. No.: 18/524,295

(22) Filed: Nov. 30, 2023

(65) Prior Publication Data

US 2025/0184409 A1　Jun. 5, 2025

(51) Int. Cl.
*H04L 67/61*　(2022.01)
*G06F 9/54*　(2006.01)

(52) U.S. Cl.
CPC .............. *H04L 67/61* (2022.05); *G06F 9/547* (2013.01)

(58) Field of Classification Search
CPC ..... H04L 67/60–61; H04L 67/63; G06F 9/54; G06F 9/547
See application file for complete search history.

(56) References Cited

U.S. PATENT DOCUMENTS

| | | | | |
|---|---|---|---|---|
| 10,503,553 | B1 | 12/2019 | Ashok et al. | |
| 10,572,315 | B1 * | 2/2020 | Lusk ........................ | G06F 9/541 |
| 11,848,857 | B1 * | 12/2023 | Griffin .................... | H04L 67/10 |
| 11,922,230 | B2 * | 3/2024 | Dewhare ................. | G06F 8/73 |
| 2011/0035749 | A1 | 2/2011 | Krishnakumar et al. | |
| 2013/0060933 | A1 | 3/2013 | Tung et al. | |
| 2017/0024231 | A1 | 1/2017 | Riel et al. | |

| | | | | |
|---|---|---|---|---|
| 2017/0346880 | A1 * | 11/2017 | Gay ..................... | H04L 65/1069 |
| 2019/0130327 | A1 * | 5/2019 | Carpenter ........... | H04L 41/0895 |
| 2020/0372088 | A1 * | 11/2020 | Liu ...................... | G06F 16/9535 |
| 2021/0124684 | A1 * | 4/2021 | Russell ............... | G06F 12/0855 |
| 2023/0229534 | A1 * | 7/2023 | Mohanty ................. | G06F 9/547 |
| | | | | 719/328 |
| 2023/0267018 | A1 * | 8/2023 | Bakshi ................... | G06F 21/44 |
| | | | | 719/328 |
| 2024/0126624 | A1 * | 4/2024 | Ghergu .................. | G06F 9/547 |

OTHER PUBLICATIONS

International Search Report and Written Opinion for Application No. PCT/US2024/053539, mailed on Jan. 10, 2025, 9 pages.

* cited by examiner

*Primary Examiner* — Jason D Recek

(74) *Attorney, Agent, or Firm* — Kowert, Hood, Munyon, Rankin & Goetzel, P.C.; Gareth M. Sampson; Dean M. Munyon

(57) ABSTRACT

Various techniques are disclosed for providing gateway services between a client system and downstream service systems for a service system. The disclosed gateway service system is capable of implementing a new service for a client system in response to a request from the client system. The gateway service system internally determines which downstream services are needed to implement the new service. In various instances, the gateway service system utilizes machine learning algorithms to determine the downstream services suitable for providing the output needed for the new service. The gateway service system is also capable of determining whether an existing application programming interface (API) is able to be used for the new service or whether a new API needs to be created for the new service. By internally determining the downstream services and APIs, the gateway service system has more efficient utilization of its computational resources.

20 Claims, 10 Drawing Sheets

*Reporting Process 700 implemented by Reporting Module 520*

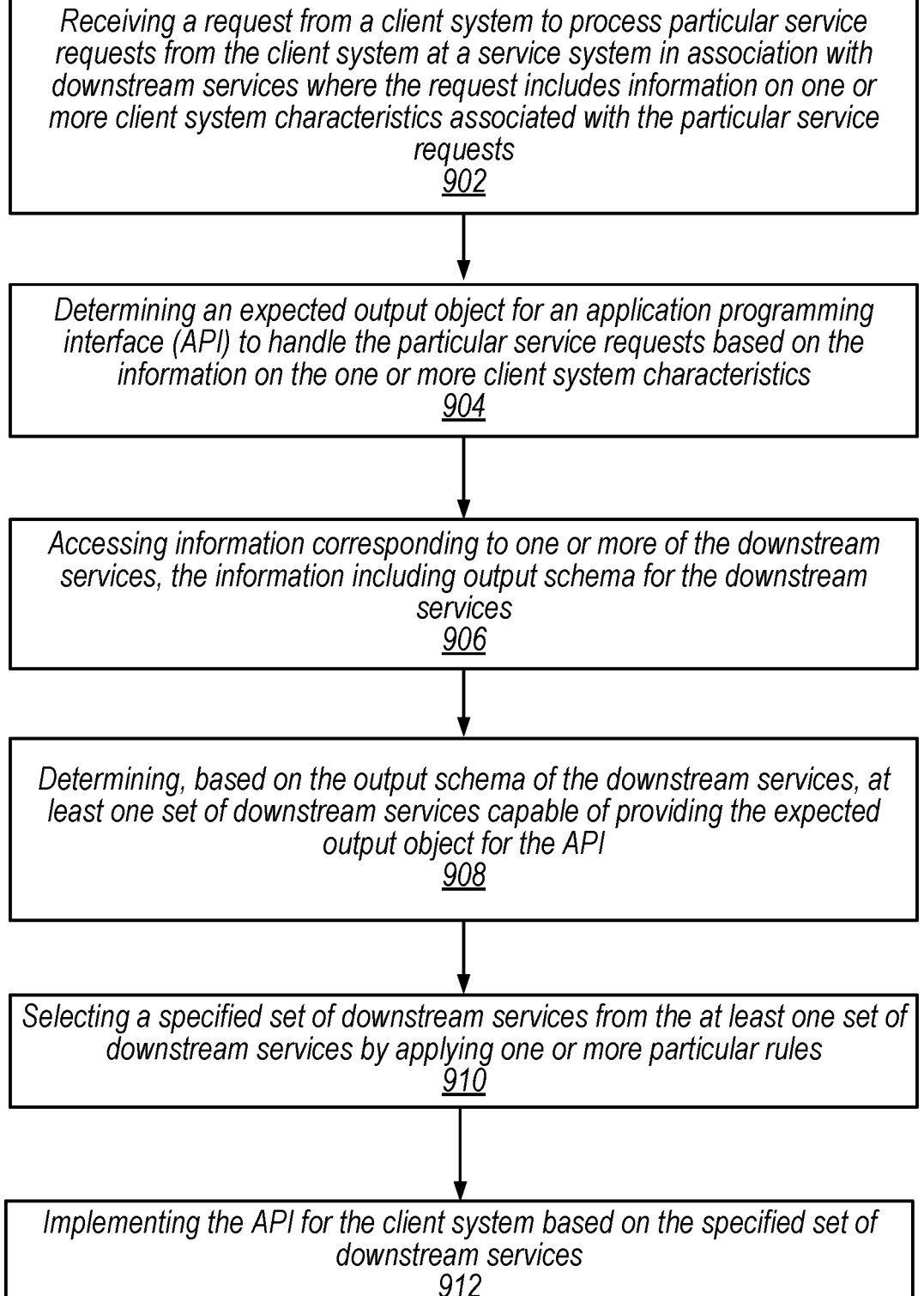

Receiving a request from a client system to process particular service requests from the client system at a service system in association with downstream services where the request includes information on one or more client system characteristics associated with the particular service requests
902

Determining an expected output object for an application programming interface (API) to handle the particular service requests based on the information on the one or more client system characteristics
904

Accessing information corresponding to one or more of the downstream services, the information including output schema for the downstream services
906

Determining, based on the output schema of the downstream services, at least one set of downstream services capable of providing the expected output object for the API
908

Selecting a specified set of downstream services from the at least one set of downstream services by applying one or more particular rules
910

Implementing the API for the client system based on the specified set of downstream services
912

*FIG. 9*

GATEWAY SERVICE DRIVEN DOWNSTREAM ORCHESTRATION

BACKGROUND

Technical Field

This disclosure relates generally to implementing a gateway service in a service system, including methods for orchestration of downstream services for servicing client requests to the gateway service, according to various embodiments.

Description of the Related Art

Gateway services are implemented in service systems to act as an entry point for multiple services, both upstream (e.g., client services) and downstream (e.g., decision services) of the gateway services. For instance, a gateway service may be responsible for calling multiple downstream decision services in response to a request from a client service. The gateway service may determine (e.g., orchestrate) which downstream services to call and, in some instances, which order to call the services. Large enterprises (e.g., large transaction services) may maintain hundreds of downstream microservices with these services being created for specific requirements. In many cases, these service operations look similar but back end data and computation may vary from service to service. Generally, all these services are abstracted from the client using an API gateway layer. For instance, the client connects to the gateway and then, in the gateway, orchestration is done to multiple downstream services depending on the intent and use case for the specific client.

When a new requirement to an existing service or a need for a new service is to be created, product/business owners can utilize vast amounts of computer resources in order to determine all the needed dependencies and achieve the desired intent for either the existing service or the new service. In some instances of large enterprises, it may be difficult to determine whether an already existing service or a group of services satisfies the intent without some guidance. For instance, it may be difficult and resource exhausting to determine whether a minor enhancement to an existing service or services can satisfy the intent, or whether a new service needs to be developed for the intent. Applicant recognizes that developing advanced techniques for examining the intent and determining capabilities of existing services in servicing the intent may improve computer resource utilization when a new requirement to an existing service is added or a new service is to be created and provides solutions discussed herein.

BRIEF DESCRIPTION OF THE DRAWINGS

FIG. 9 is a flow diagram illustrating a method for determining a decision response to a service request, according to some embodiments.

Figure 1:
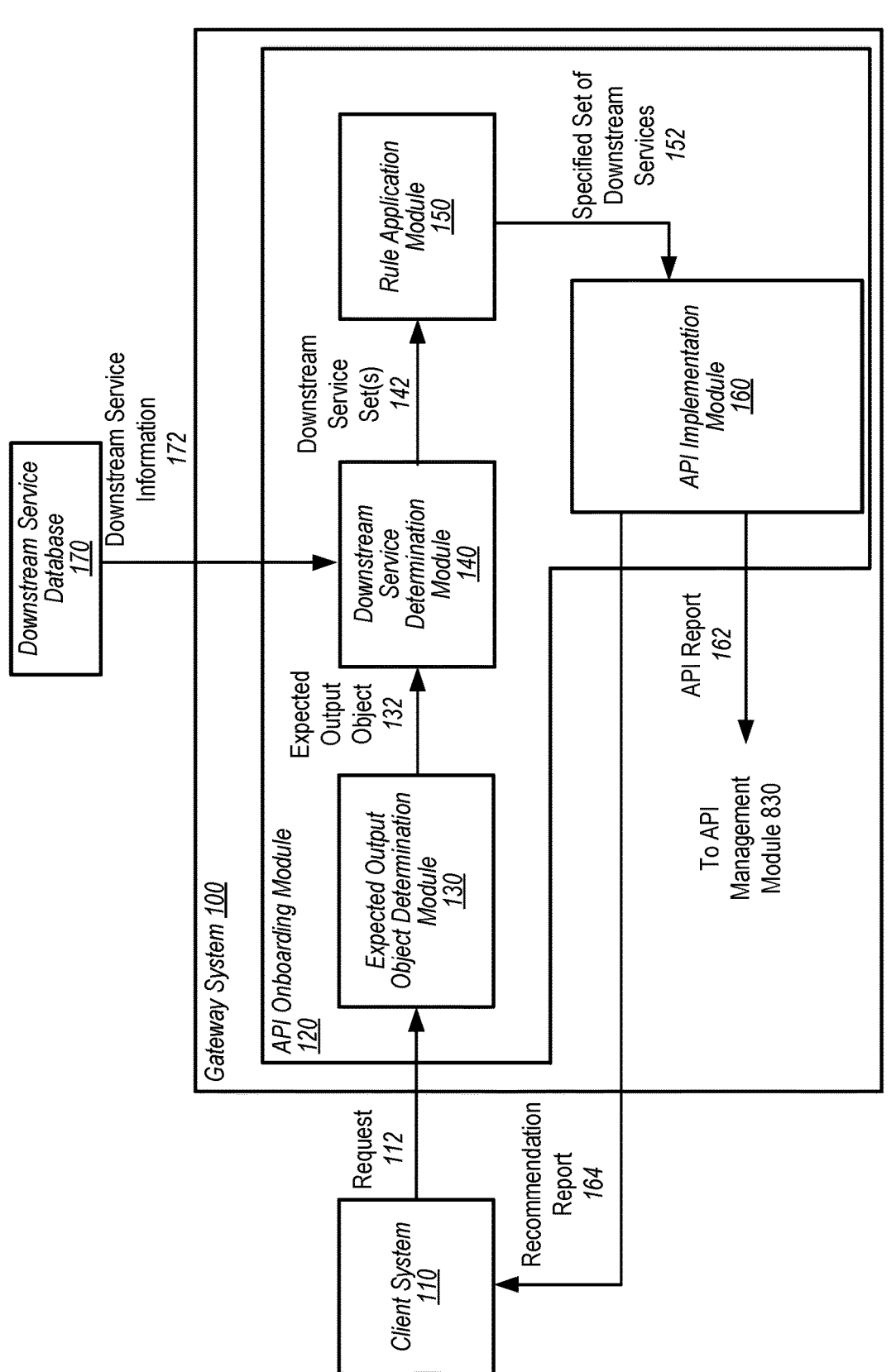
FIG. 1 is a block diagram of a gateway system, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques related to orchestration of services for a client system of a gateway service in a service system (e.g., a "service computer system"). As used herein, the terms "service computer system" or "service system" refer to any online system that implements a service in which two or more parties use computer systems to exchange information. Examples of online systems include, but are not limited to, payment processing systems, transaction processing systems, social network systems, file transfer systems, online retailer systems, dating site systems, streaming service systems, and customer service systems. Accordingly, a "service" according to this disclosure may include a transaction service, a payment service (e.g., PAYPAL), a social network, a file transfer service, an online retailer, a dating site, and so on. Note that generally, this disclosure may include various examples and discussion of techniques and structures within the context of a "service computer system" or "service system." Note that all these examples, techniques, and structures are generally applicable to any online system that allows access and the exchange of information to provide services to a user. For example, a service computer system may be any online system in some instances. However, the term service computer system is used for ease of understanding in various portions of this disclosure.

In many instances, a gateway service is utilized in a service system as an entry or coordination point between multiple services. The services may be upstream services such as client system services or downstream services such as decision services. The gateway service may coordinate communication and exchange of information between the upstream services and the downstream services. For instance, in a service system, a gateway service may be responsible for calling multiple downstream services in response to a request from a client system. The gateway service may include, for example, an API (application programming interface) that determines (e.g., orchestrate) which downstream services to call and, in some instances, which order to call the services for a client system based on a service request from the client system. The API may make the determinations of which downstream services to call, and in which order, based on the intent of the request and a particular use case for the request. For a transaction service (e.g., a payment service), examples of downstream services to be called include decision services such as, but not limited to, limit based services, risk based services, or compliance based services.

With growth in the implementation of gateway services, the number of upstream and downstream services handled by a particular gateway service has grown from a handful to tens or hundreds or thousands depending on the responsibility of the particular gateway service. When there is a change or addition in requirements for an existing client system service or a new client system service is added, a search needs to be done to find all the dependencies (e.g., downstream services) that may be capable of providing the desired result (e.g., desired responses needed for the client system). When the number of available downstream services is very large, it becomes very complex and time consuming to search all the available downstream services to determine those that will satisfy the new client system service requirements. For example, a basic problem with searching these large numbers of downstream services using basic search queries (e.g., word search tool) is that multiple results that look similar may be found without any way of differentiating the results. Deeper analysis is needed for differentiating the results, which may involve looking at detailed documents or better understanding of data sources for the downstream services.

While the gateway service is capable of handling orchestration based on incoming requests from service systems, it may not readily have this deeper information helpful in determining what downstream services may best be suitable for providing new client system service requirements. In order to find this information, efforts may need to be made to contact the downstream services to get more detailed information and find the services that provide the needed results. Additionally, efforts may need to be made to determine which downstream services can satisfy any constraints for providing the new client system service requirements.

Even with all these efforts to get new information, the possibility exists that when changes or additions in requirements for an existing client system service are added or a new client system service is added to a gateway service, there may be duplication of already existing orchestration. For example, a new API may be created for changes or additions in requirements for the existing client system service or addition of a new client system service even though there may be an already existing API that would serve these needs. The new API may be created because the search fails to find the existing API or there is insufficient effort put forward to find the existing API. Additionally, in some instances, new API may be created that does not efficiently utilize existing resources (e.g., downstream services are not utilized efficiently). These duplications of APIs and the inefficient utilization of existing resources may waste computer resources, waste memory storage capacity associated with gateway service, take up valuable computational space on computer systems associated with the service system, and cause unnecessary network traffic utilization.

The present disclosure contemplates various techniques for a gateway service to implement automated and "smart" implementation (e.g., orchestration) of APIs in the gateway service when a request for a change or addition for an existing client system service or a request for an addition of a new client system service is received by the gateway service. For instance, in the disclosed embodiments, the gateway service implements an "API onboarding engine" that can determine how to implement existing or new APIs in response to requests from a client system service. In various embodiments, a request from a client system to process particular service requests is received at the gateway service. The request may be, for example, a request for a change or modification to an existing service associated with the client system or a request for a new client system service. The request may include information about the requirements of the change/modification in existing service or new service. This information may include, for example, information that indicates what the input will be from the client system and what the client system needs for the output (e.g., response) from the gateway service back to the client system. The API onboarding engine may take this information and, along with accessing information about available downstream services, apply various techniques to implement an API in the gateway service that satisfies the requirements for the change/addition in existing client service or new client service for the client system.

In various embodiments, the API onboarding engine receives the information in the request from the client system and applies various processing, including, but not limited to, text processing, in combination with machine learning to determine expected output provided by the gateway service in response to requests from the client system. Determining the expected output may include enrichment of the data for the expected output to place the data in a structured format suitable for further processing by the API onboarding engine. In certain embodiments, the expected output data is in a structured format suitable for processing and analysis by various machine learning algorithms to determine downstream services capable of providing the expected output. These machine learning algorithms may include, for example, supervised or cluster-based machine learning algorithms that take the expected output as input along with information about the available downstream services to provide as output suggestions (e.g., matches) for downstream services capable of providing the expected output along with confidence scores for the suggestions. The information about the available downstream services applied in the machine learning algorithms may include, for example, what are the input and output of the various downstream services. This information can then be used by the machine learning algorithms to provide outputs as to what downstream services (either by themselves or in combination with other services) can provide the expected output with some confidence score.

The information about the available downstream services may also include other information that can be used to filter the results from the machine learning algorithms. For example, the information may include latency information, privacy policy information, or service level agreement information that can be used to filter or decide between multiple outputs from the machine learning algorithms to decide on the downstream service or combination of downstream services that are best suited to provide the expected output. In various embodiments, the filtering or decision process based on this information is implemented through application of rules-based decisioning on the output of the machine learning algorithms (e.g., the list of possible downstream services or combinations of downstream services provided by the machine learning algorithms). After filtering/deciding between the outputs, in certain embodiments, further decisioning is implemented to determine whether an existing API in the gateway service can serve the client system service, modifications to one or more downstream services are needed, new downstream services are needed, a new API needs to be created to serve the client system service, or combinations of these steps are needed. Accordingly, the API (whether new or existing) is then implemented in the gateway service to provide the service for the client system. Additionally, in some embodiments, a report may be generated notifying the client system of the API (whether new or existing) and any related information needed by the client system to begin operations utilizing the API.

One embodiment described herein has three broad components: 1) determining an expected output object for an API based on information provided in a request from a client system, 2) determining possible sets of downstream services capable of providing the expected output object based on output schema of the downstream services, and 3) selecting a specified set of downstream services by applying one or more predetermined rules to the determined set. Note that the possible sets or specified set of downstream services may include a single downstream service or a combination of multiple downstream services. In various embodiments, the selecting of the specified set is based on confidence scores or other criteria (e.g., requirements or constraints) applied to the possible sets of downstream services. Confidence scores may also be applied to determine whether an existing API is available in the gateway service or a new API needs to be created in the gateway service based on the specified set. Confidence scores may further be applied to determine whether modifications need to be made to downstream services in the specified set or new downstream services are needed. In certain embodiments, the existing or new API is implemented in the gateway to provide the service to the client system and the client system is notified and given information to operate with the existing or new API.

As described herein, with the implementation of the API onboarding engine and its various elements, requests for changes/modifications to existing client system services or requests for new client system services may now be more readily handled within the gateway service itself. For instance, the gateway service may receive these requests and implement an existing API or a new API to add services for these requests without the need for outside development or further input by the client system. Further, the API onboarding engine allows the gateway service to determine how to implement an existing API or a new API that provides efficient utilization of the resources (e.g., the downstream services and related infrastructure (such as networking infrastructure) available to the gateway service. Additionally, utilizing the API onboarding engine reduces the possibility of creating new APIs that may be duplicates of already existing APIs. Accordingly, implementation of the API onboarding engine in a gateway service may provide more efficient utilization of computational resources, reduce waste of computer storage, increase computational capacity, and reduce network traffic requirements.

FIG. 1 is a block diagram of a gateway system, according to some embodiments. In certain embodiments, gateway system 100 is implemented in a service system to determine decisions in response to requests from client system 110, as described herein. For instance, gateway system 100 may be implemented in a service system (such as PayPal®) to make calls to one or more downstream service systems in response to a request from a client system (such as client system 110). The request may include, for example, a request for a service related decision such as a transaction approval decision. The request may, however, be a request for service to any of various online service systems such as, but not limited to, transaction processing systems, social network systems, file transfer systems, online retailer systems, dating site systems, streaming service systems, and customer service systems. In various embodiments, gateway system 100 is capable of determining and providing a final decision response to the client system 110 based on the responses received from the downstream service systems. Additional description related to gateway system 100 is provided with reference to FIG. 8 below.

Gateway system 100 and its components may be implemented by one or more computer processors operating as a computing system. As used herein, the term "computing system" refers to any computer system having one or more interconnected computing devices. Note that generally, this disclosure may include various examples and discussion of techniques and structures within the context of a "computer system." Note that all these examples, techniques, and structures are generally applicable to any computing system that provides computer functionality. The various components of a computing system (e.g., computing devices) may be interconnected. For instance, the components may be connected via a local area network (LAN). In some embodiments, the components may be connected over a wide-area network (WAN) such as the Internet.

In the illustrated embodiment, gateway system 100 includes API onboarding module 120. In various contemplated embodiments, API onboarding module 120 includes expected output object determination module 130, downstream service determination module 140, rule application module 150, and API implementation module 160. In certain embodiments, API onboarding module 120 receives request 112 from client system 110. Request 112 may be, for example, a request for gateway system 100 to process particular service requests of the gateway system by client system 110. The particular service requests may, for instance, be requests of gateway system 100 to query one or more downstream services and provide a response decision to client system 110.

In some embodiments, request 112 is a request to implement a new service for client system 110. For instance, client system 110 may be adding a new output (such as an intent or purpose) for the client system or client system 110 may be a completely new client system attempting to connect with gateway system 100. In some embodiments, request 112 is a request to change/modify an existing service for client system 110. For example, client system 110 may make request 112 to change/modify an existing service between the client system and gateway system 100 when a new requirement is needed for the existing service. In instances of a transaction service system, the new requirement may be a new business requirement that changes output such as an intent or purpose of the service provided by gateway system 100 to client system 110. Examples of intents for transaction service systems include, but are not limited to, evaluations for fraud detection, evaluations for risk detection, and evaluations for compliance.

In certain embodiments, request 112 includes information on one or more client system characteristics associated with the service to be handled by gateway system 100. The information may be information provided by client system 110 about known inputs and outputs desired for the service to be handled by gateway system 100. For instance, the information may include an intent or purpose for the service (e.g., reason client system 110 is asking for the service), sample payload data (e.g., available data with client system 110 that can be passed to gateway system 100), and service level agreement (SLA) information. SLA information may include, for example, information about latency requirements (such as time permissible for response), geographic requirements, privacy requirements, or other constraints that may be placed on responses from gateway system 100 to client system 110.

Figure 2:
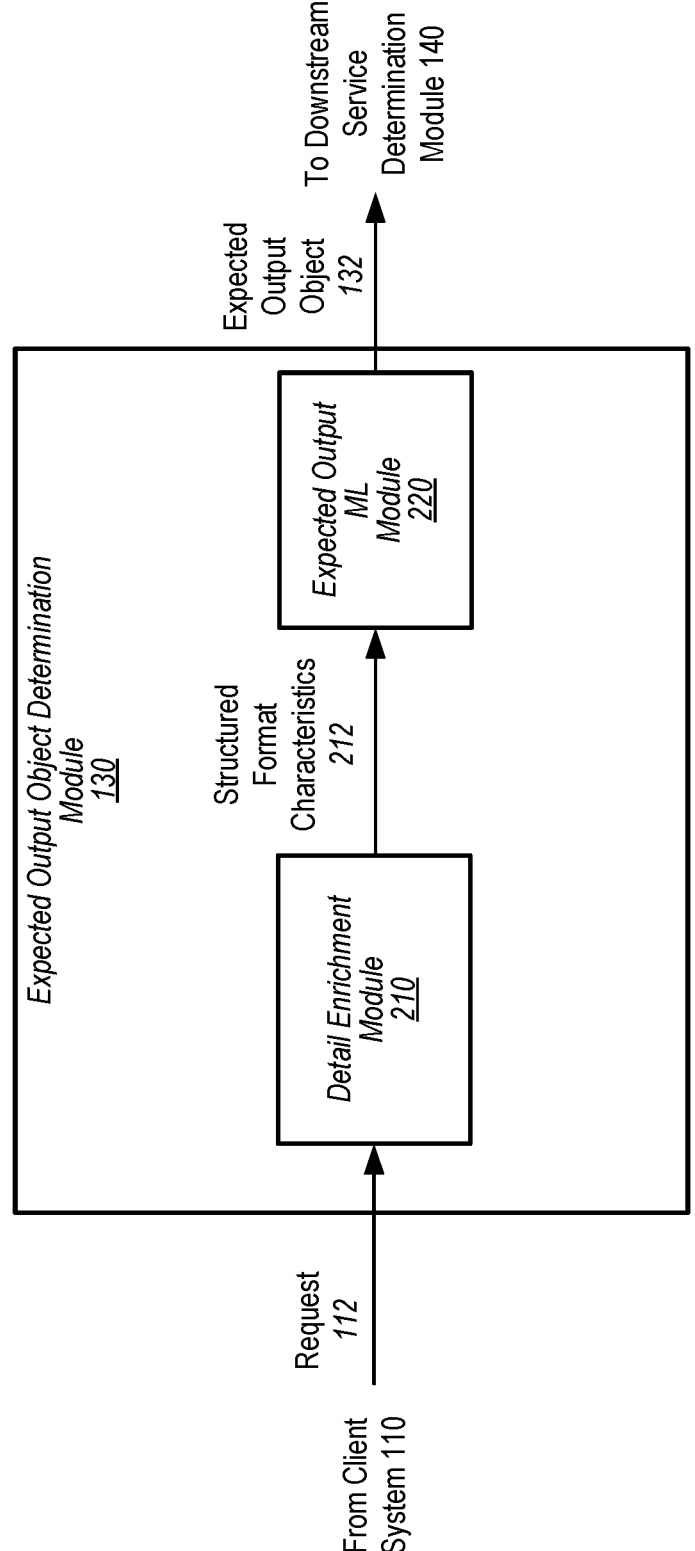
FIG. 2 is a block diagram of an expected output object determination module, according to some embodiments.

As shown in FIG. 1, request 112 is received by expected output object determination module 130 in API onboarding module 120. In certain embodiments, expected output object determination module 130 processes request 112 to determine expected output object 132. FIG. 2 is a block diagram of expected output object determination module 130, according to some embodiments. In the illustrated embodiment, expected output object determination module 130 includes detail enrichment module 210 and expected output ML (machine learning) module 220.

In various embodiments, detail enrichment module 210 includes various processing techniques that enrich the details of the information provided in request 112. For example, request 112 may include information (such as intent or SLA information) in a plain language format (such as plain English format). This plain language format may, however, not be suitable for use as input into machine learning algorithms, which typically need more structured input. Accordingly, detail enrichment module 210 may apply various processing techniques including, but not limited to, text processing that convert the client system characteristics from the plain language format into a more structured format suitable for input in machine learning algorithms. In certain embodiments, detail enrichment module 210 transforms the information in request 112 into structured format characteristics 212, as shown in FIG. 2.

Structured format characteristics 212 are provided to expected output ML module 220. Expected output ML module 220 may implement one or more machine learning algorithms that process structured format characteristics 212 to determine expected output object 132. In some embodiments, the machine learning algorithms in expected output ML module 220 include supervised machine learning algorithms such as convolutional neural network (CNNs). In certain embodiments, expected output object 132 is data that provides a structured and granular description of the output that client system 110 expects to receive from gateway system 100 in response to a service request. For example, expected output object 132 may be data that details a business expected output object in a schematic format. The format of expected output object 132 may be a format suitable for additional processing by machine learning algorithms (e.g., the machine learning algorithms in downstream service determination module 140, described below).

Turning back to FIG. 1, expected output object 132 from expected output object determination module 130 is provided to downstream service determination module 140. In various embodiments, downstream service determination module 140 processes expected output object 132 to determine possible downstream service set(s) 142 that are capable of providing the expected output object. For instance, downstream service determination module 140 may implement one or more machine learning algorithms that take expected output object 132 as input and apply information on output schema for available downstream services to determine downstream services or combinations of downstream services that may be capable of providing the expected output object at a suitable level (e.g., with some level of confidence).

Figure 3:
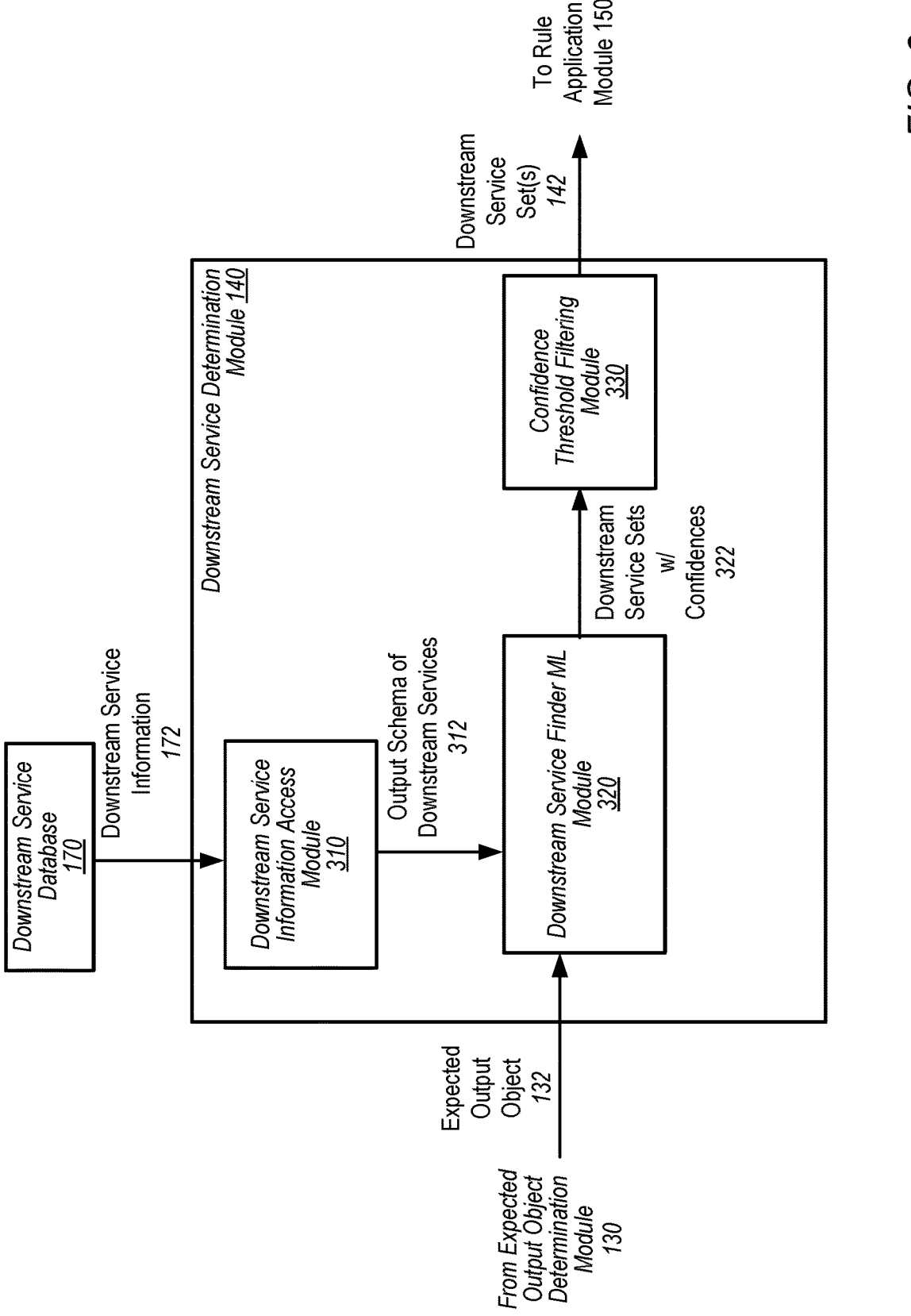
FIG. 3 is a block diagram of a downstream service determination module, according to some embodiments.

FIG. 3 is a block diagram of downstream service determination module 140, according to some embodiments. In the illustrated embodiment, downstream service determination module 140 includes downstream service information access module 310, downstream service finder machine learning (ML) module 320, and confidence threshold filtering module 330. In various embodiments, downstream service information access module 310 accesses downstream service information 172 on available downstream services from downstream service database 170. Downstream service database 170 may be, for example, a service catalog or other repository storing information on available downstream services for gateway system 100. Downstream service information 172 may include input and output schema for the downstream services. For example, downstream service information 172 may include input and output schema for the downstream services that is determined according to service contracts between the downstream services and gateway system 100. In various embodiments, downstream service information 172 is metadata describing the input and output schema for the downstream services. In certain embodiments, the metadata also includes information on existing APIs associated with the downstream services.

Downstream service information access module 310 provides output schema 312 of downstream services to downstream service finder ML module 320. Expected output object 132 and output schema 312 are applied as input into one or more machine learning algorithms in downstream service finder ML module 320. In various embodiments, downstream service finder ML module 320 implements cluster-based algorithms to find downstream services (e.g., single downstream services) or combinations of downstream services that can provide expected output object 132 based on output schema 312. Accordingly, application of the machine learning algorithms (e.g., cluster-based algorithms) in downstream service finder ML module 320 provides the output of downstream service sets with confidences 322 where the sets can include a single downstream service or a combination of downstream services that can provide expected output object 132. The confidences in 322 are indicators of predicted confidences by the machine learning algorithms that a downstream service or a combination of downstream services can provide expected output object 132. For example, a 100% predicted confidence would be provided if the machine learning algorithms are fully confident that the downstream service(s) can provide expected output object 132.

In some embodiments, the confidence levels may be used to filter the downstream service sets in 322 in confidence threshold filtering module 330. For example, a threshold may be set at 50% to only have downstream service sets with confidence levels above 50% be proved as downstream service set(s) 142 as output of downstream service determination module 140. While confidence threshold filtering module 330 is shown separately from downstream service finder ML module 320 in the illustrated embodiment, it should be understood that the confidence level filtering may be implemented as part of the machine learning algorithms. For instance, the machine learning algorithms may be set to only output predictions with confidence scores above the threshold. As shown in FIG. 3, along with FIG. 1, the output of downstream service determination module 140 is downstream service set(s) 142. As described herein, downstream service set(s) 142 include one or more sets of downstream services (which can include a single downstream service or a combination of downstream services) that are capable of providing the expected output object (e.g., expected output object 132) for the API to be implemented for the client system in response to its request.

Turning back to FIG. 1, downstream service set(s) 142 from downstream service determination module 140 are provided to rule application module 150. In certain embodiments, downstream service set(s) 142 are provided to rule application module 150 along with their confidence scores and any metadata associated with the downstream services in the set(s). At rule application module 150, various particular (e.g., predetermined) rules may be applied to downstream service set(s) 142 to filter the downstream service sets by rules-based decisioning. The rules may be applied to metadata for the downstream service set(s) 142. In some embodiments, additional data such as execution stats for downstream services or APIs associated with the downstream services in the downstream service set(s) 142 may be accessed and rules applied to the execution stats.

Figure 4:
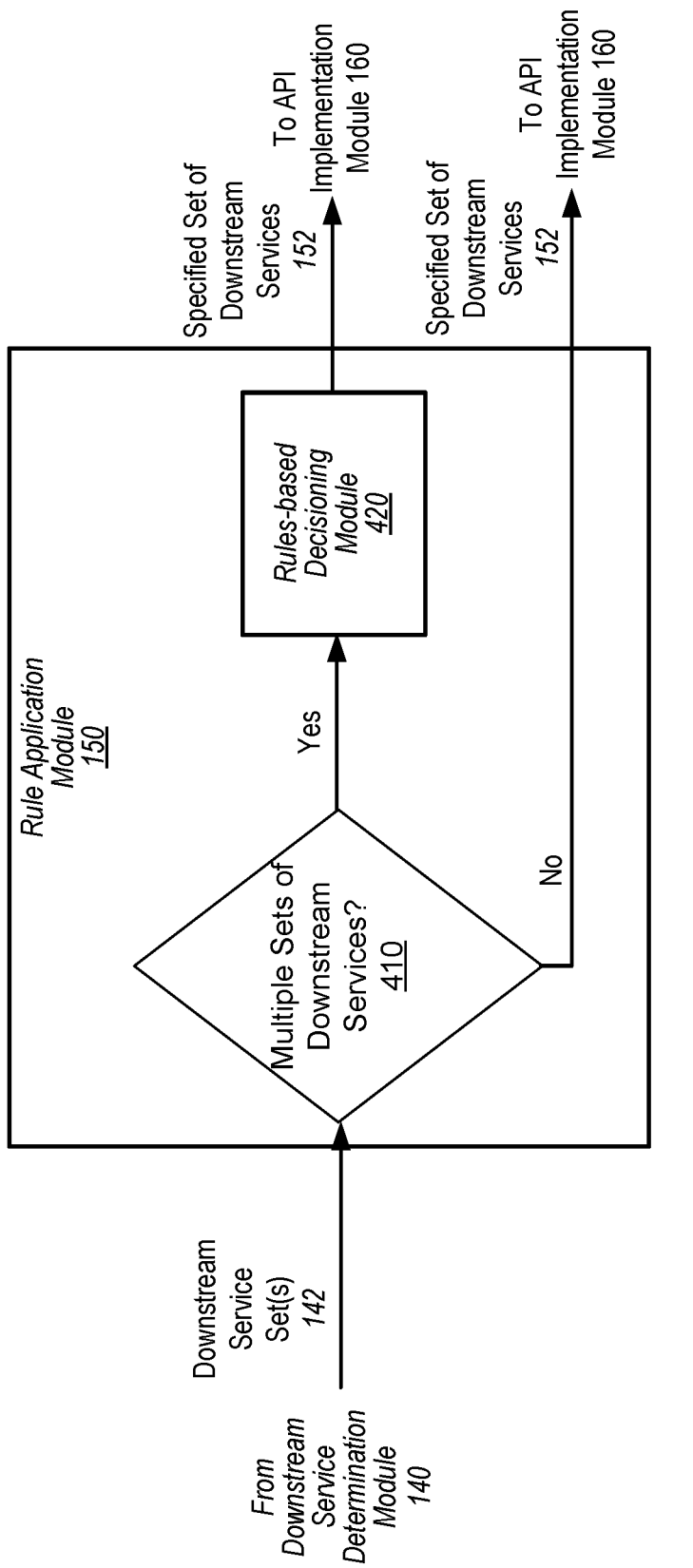
FIG. 4 is a block diagram of a rule application module, according to some embodiments.

FIG. 4 is a block diagram of rule application module 150, according to some embodiments. In the illustrated embodiment, rule application module 150 includes determining whether multiple sets of downstream services are includes in downstream service set(s) 142 at 410 in order to decide whether to apply rules-based decision by rules-based decisioning module 420. For instance, at 410, when downstream service set(s) 142 includes only a single set of downstream services ("No") then the single set is output as specified set of downstream services 152 and provided to API implementation module 160.

When it is determined at 410 that multiple sets exist in downstream service set(s) 142 ("Yes") then the multiple sets are processed in rules-based decisioning module 420 to determine specified set of downstream services 152. In some embodiments, rules-based decisioning in rules-based decisioning module 420 includes applying the rules on the multiple sets to determine a single "best" set from the multiple sets. The rules may be, for example, criteria (e.g., constraints) particular to client system 110 that enable selection between multiple sets capable of providing the expected output to the client system. The rules may include rules such as, but not limited to, latency, privacy, service level agreement (SLA) data, and geographic data (e.g., geography data). Criteria associated with these rules may have to be satisfied for a set of downstream services to pass the filtering in rule application module 150. In various embodiments, the criteria are applied in rules-based decisioning module 420 through applications of thresholds to the rules. For example, a latency threshold may be applied where the downstream service set(s) 142 are determined to have latency below a specified value. In some embodiments, in order to select a single downstream service set, rankings of values for the rules may be applied. For instance, a ranking of latencies for downstream service set(s) 142 may be used to select the downstream service set with the best latency (e.g., lowest latency).

As shown in FIG. 4, applying rules in rules-based decisioning module 420 determines a specified set of downstream services 152 from downstream service set(s) 142. In certain embodiments, specified set of downstream services 152 is a single downstream service or a combination of downstream services that is capable of providing expected output object 132 and satisfies the rules (e.g., constraints) applied in rules-based decisioning module 420. In particular embodiments, specified set of downstream services 152 includes only a single set of downstream services (e.g., only a single downstream service or a single combination of downstream services). Embodiments may be contemplated, however, where specified set of downstream services 152 includes multiple sets of downstream services. For instance, multiple sets of downstream services may satisfy the confidence levels threshold in downstream service determination module 140 and satisfy the rules (e.g., constraints) applied in rules-based decisioning module 420. In such embodiments, further processing may determine which set of downstream services is implemented. For instance, additional input from client system 110 may be utilized to determine which set of downstream services is implemented in gateway system 100 in response to the initial request from the client system.

In various embodiments, as shown in FIG. 1, specified set of downstream services 152 is provided to API implementation module 160. API implementation module 160 may include various processing to determine whether an existing API in gateway system 100 can be utilized for specified set of downstream services 152, a new API needs to be created in the gateway system for specified set of downstream services 152, one or more of the downstream services in the specified set of downstream services 152 needs to be modified for satisfying the request from client system 110, or one or more new downstream services need to be created in order to satisfy the request from the client system. In some embodiments, API implementation module 160 is capable of implementing the API in gateway system without additional input. In other embodiments, API implementation module 160 needs input from other systems (e.g., client system 110) for implementation of the API. In various embodiments, API implementation module 160 interfaces with other components of gateway system 100 to implement the API (such as API management module 830, shown in FIG. 8). Additionally, while the following description describes rules-based processing in API implementation module 160 in order to determine implementation of the API for the requested service from client system 110, various embodiments may be contemplated where some or all of the processing in API implementation module 160 is implemented in rule application module 150. Similarly, the processing rule application module 150 may be implemented in API implementation module 160. Additional modules may also be contemplated to provide the various processing of either API implementation module 160 or rule application module 150.

Figure 5:
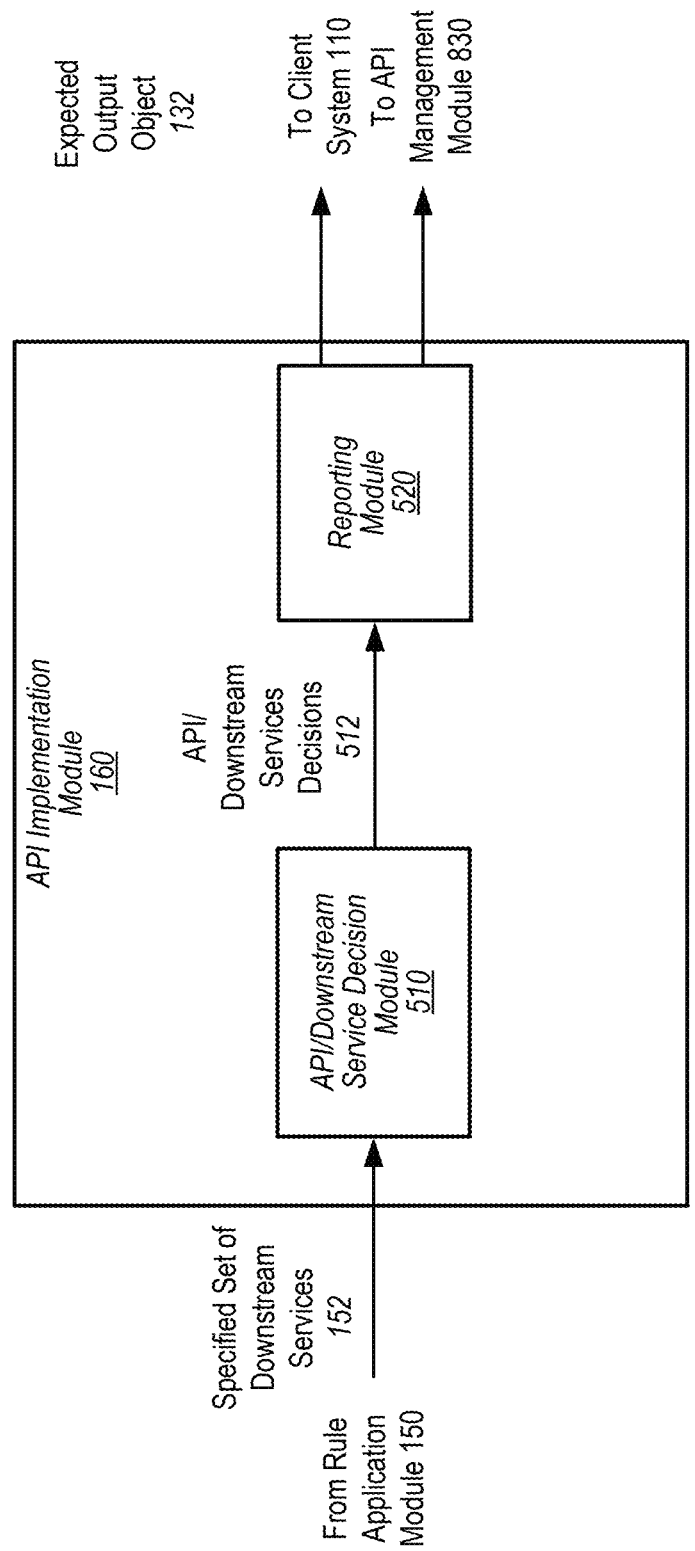
FIG. 5 is a block diagram of an API implementation module, according to some embodiments.

FIG. 5 is a block diagram of API implementation module 160, according to some embodiments. In the illustrated embodiment, API implementation module 160 includes API/Downstream service decision module 510 and reporting module 520. In certain embodiments, API/Downstream service decision module 510 makes determinations on whether an existing API can provide the service associated with specified set of downstream services 152 or a new API needs to be created for specified set of downstream services 152. Additionally, API/Downstream service decision module 510 may determine whether downstream services need to be modified or new downstream services are needed based on specified set of downstream services 152. These decisions may be provided as API/downstream services decisions 512 to reporting module 520. Reporting module 520 may then provide various reports or interface with client system 110 (shown in FIG. 1) or API management module 830 (shown in FIG. 8) for implementation of the new service in gateway system 100.

Figure 6:
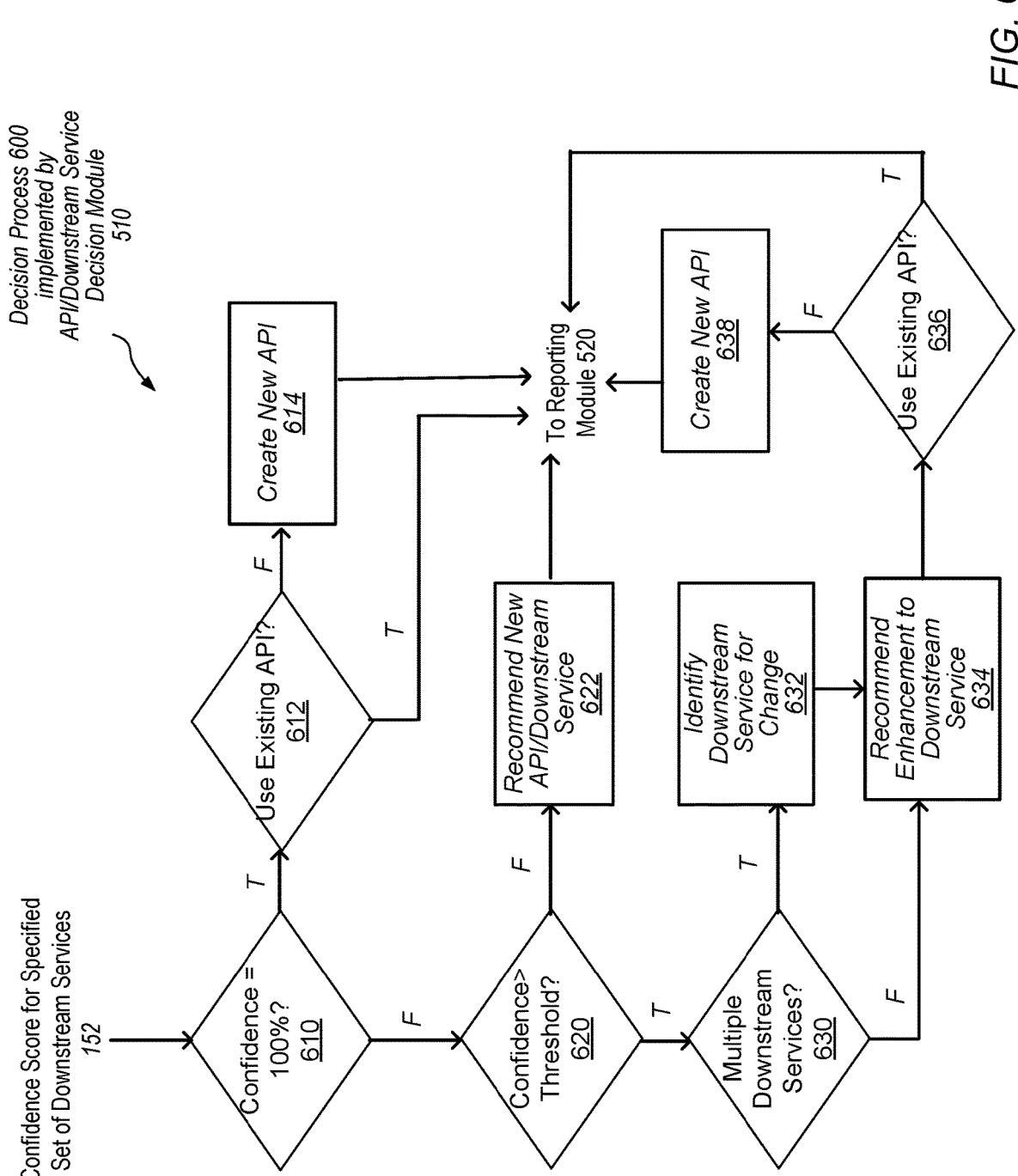
FIG. 6 is a block diagram of a decision process implemented by an API/Downstream service decision module, according to some embodiments.

FIG. 6 is a block diagram of a decision process implemented by API/Downstream service decision module 510, according to some embodiments. In the illustrated embodiment, API/Downstream service decision module 510 implements decision process 600 to process various decisions based on a confidence score for specified set of downstream services 152. The confidence score may be the confidence score determined by downstream service determination module 140, as described above.

In various embodiments, decision process 600 begins with assessing whether the confidence score for the specified set of downstream services 152 is 100% (e.g., the specified set of downstream services is a full match to provide expected output object 132, shown in FIGS. 1 and 2). If the confidence score is 100% ("T") then decision process 600 continues to 612. At 612, it is determined whether an API already exists in gateway system 100 for the specified set of downstream services. If the API already exists ("T") then the information on the existing API is provided to reporting module 520. If the API does not exist ("F") then a new API is created at 614. Creating a new API may be implemented, for example, through coordination between API implementation module 160 and API management module 830, shown in FIG. 8. In some embodiments, the new API may be created by API implementation module 160 and then provided for management by API management module 830. After the new API is created at 614, the information on the new API is provided to reporting module 520.

Turning back to 610, when the confidence score is not 100% ("F") then decision process 600 moves to assessing the confidence score against a threshold at 620. The threshold may be, for example, some confidence score below 100% that provides some level of confidence that the specified set of downstream services is capable of providing expected output object 132. For instance, in one contemplated embodiment, the threshold may be a 70% confidence score. At 620, if the confidence score is below the threshold ("F") then decision process 600 continues to 622. At 622, it is determined to provide a report to client system 110 (via reporting module 520) that includes a recommendation that the specified set of downstream services may be utilized and what API may be available to implement the specified set of downstream services. The report may include information on the confidence score for the specified set of downstream services along with an indication that the specified set is the currently best available set for the new service. Client system 110 may then determine how to proceed after receiving the report. For instance, client system 110 can choose to utilize the specified set and any available APIs (or ask for a new API to be created) or the client system can request creation of new downstream services and new APIs.

At 620, if the confidence score is above the threshold ("T") then decision process 600 continues to 630. At the confidence score is above the threshold at 630, decision process 600 continues with recommending enhancements to downstream services rather than creation of completely new services. Recommending (and implementing) enhancements may avoid unnecessary creation of new services. At 630, it is determined whether there are multiple downstream services or a single downstream service in the specified set of downstream services. When there are multiple downstream services ("T") then one or more downstream services are identified for modification at 632. The identification may be based on whether the modification will increase the confidence score of the specified set of downstream services in providing the expected output object 132. At 634, the recommended enhancement to the identified downstream services is determined. When there is a single downstream service ("F") then the single downstream service is recommended for enhancement directly at 634.

At 636, it is determined whether an existing API is capable of handling the specified set of downstream services with the recommended enhancements. If, at 636, an existing API is determined to be in place then the existing API and the recommended enhancements to the downstream services are provided to reporting module 520. If, at 636, an existing API is not found then a new API is created at 638. After creation of the new API at 638, the new API and the recommended enhancements to the downstream services are provided to reporting module 520.

Turning back to FIG. 5, decisions 512 determined by API/Downstream service decision module 510 are provided to reporting module 520. Decision 512 include, in certain embodiments, the decisions made by decision process 600. For instance, as shown in FIG. 6, all of the various decisions made during decision process 600 are eventually provided to reporting module 520.

At the end of decision process 600, various information for the responding to a request for changes/modifications to an existing client system service or a request for new client system services have been automatically generated through the various modules of API onboarding module 120, which is located in gateway system 100 itself. Thus, gateway system 100 is capable of handling these requests within the gateway system itself. Accordingly, the gateway system may handle these requests without the need for outside development or further input by the client system. Further, implementing API onboarding engine 120 in gateway system 100 provides efficient utilization of the resources (e.g., the downstream services and related infrastructure (such as networking infrastructure) available to the gateway system. The various decisions for implementing the new service also smartly take into account the possibility of existing downstream services or existing APIs capable of handling responsibility for the new service. Such decision making taking place in the gateway system reduces the possibility of creating new APIs that may be duplicates of already existing APIs. Accordingly, implementation of API onboarding engine 120 in gateway system 100 may provide more efficient utilization of computational resources, reduce waste of computer storage, increase computational capacity, and reduce network traffic requirements. Additionally, implementation of API onboarding engine 120 in gateway system 100 may reduce the effort spent by business owners in providing new services for client systems and reduce the time-to-market (TTM) for the new service to go live in the service system.

Figure 7:
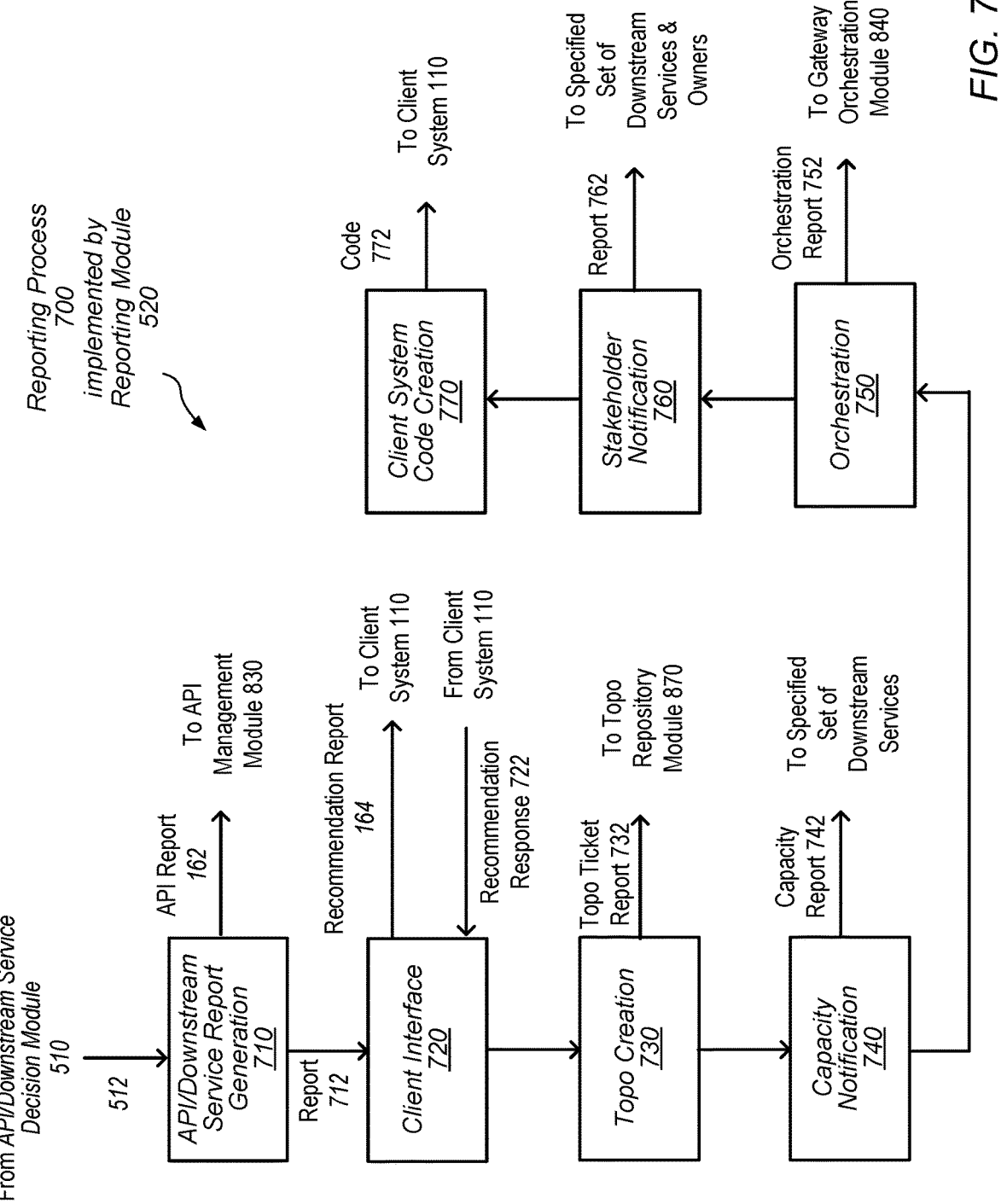
FIG. 7 is a block diagram of a reporting process implemented by a reporting module, according to some embodiments.

FIG. 7 is a block diagram of a reporting process implemented by reporting module 520, according to some embodiments. In the illustrated embodiment, reporting module 520 implements reporting process 700 to provide various reports to other components of gateway system 100 and client system 110. In various embodiments, reporting process 700 includes API report generation 710. API/downstream service report generation 710 may include accumulating information received from API/downstream service decision module 510 (e.g., API/downstream services decisions 512) and compiling the information into report 712. Report 712 may include information regarding the various decisions that have been made on APIs and downstream services during decision process 600. For example, report 712 may include information on the specified set of downstream services and whether a new API has been/needs to be created or whether an existing API has/needs to be implemented for the specified set. Report 712 may also include any recommended changes to downstream services or information that needs to be passed onto client system 110 (e.g., recommendations for new downstream services or APIs). Report 712 may be passed through the various additional steps in reporting process 700, as described below.

In some embodiments, API/downstream service report generation 710 includes generating API report 162. API report 162 may be provided to API management module 830 (shown in FIG. 8) and include information usable by the API management module to associate an existing API or a new API with the specified set of downstream services. As described herein, a new API may be generated by API implementation module 160 on its own or the API implementation module may generate the new API by interfacing with API management module 830. In some embodiments, API report 162 includes information for API management module 830 to generate a new API.

In certain embodiments, reporting process 700 includes client interface 720. Client interface 720 may include providing recommendation report 164 to client system 110. Recommendation report 164 may include any recommendations for new downstream services or APIs (such as those determined at 622 in decision process 600, shown in FIG. 6). In such embodiments, client interface 720 may receive recommendation response 722 from client system 110. Recommendation response 722 may include any decision made by client system 110 on whether to implement the recommendations or to do other processing as described herein. In some embodiments, recommendation report 164 includes information on existing APIs or new APIs that are being implemented to provide the new service for client system 110. In such embodiments, recommendation report 164 may also include information on downstream service(s) in the specified set of downstream services for client system 110 to be aware of these downstream service(s).

In various embodiments, reporting process 700 includes topo(logy) creation 730. Topo creation 730 may include generating and providing topo ticket 732 to topo repository 870. Topo ticket 732 may include, for example, information that indicates a new topology associated with implementation of the new service (e.g., topological connections to downstream services in the specified set of downstream services). This information may be used to indicate that any new connections (such as those for a new API) are safe topological connections for gateway system 100 and the downstream services. In some instances, this information may need review and approval (e.g., by architects of the service system implementing gateway system 100).

Reporting process 700 may further include capacity notification 740. Capacity notification 740 may include generating and providing capacity report 742 to the downstream services in the specified set of downstream services. Capacity report 742 may include information that indicates to the downstream services that they will be receiving additional calls due to the implementation of the new service for client system 110.

In various embodiments, reporting process 700 includes orchestration 750. Orchestration 750 includes the generation of orchestration report 752, which may be provided to gateway orchestration module 840. Orchestration report 752 may include information usable by gateway orchestration module 840 to identify the downstream services in the specified set of downstream services and determine orchestration on how to call the downstream services in the event of a future service request associated with the new service for client system 110. In certain embodiments, this orchestration is built automatically by gateway orchestration module 840 when receiving orchestration report 752.

Reporting process 700 may also include stakeholder notification 760. Stakeholder notification 760 may include generating report 762. Report 762 may be a general report of the creation of the new service for client system 110. Report 762 may be provided to the specified set of downstream services or owners (e.g., stakeholders) of other systems involved with gateway system 100. Report 762 may also include any other information from report 712 that may be necessary to the stakeholders associated with the new service.

In some embodiments, reporting process 700 includes client system code creation 770. Client system code creation 770 may include generation of code 772 and providing the code to client system 110. Code 772 may be code necessary for implementation of the new service at client system 110. For instance, code 772 may include code changes for client system 110 to be able to onboard the new service at the client system.

Figure 8:
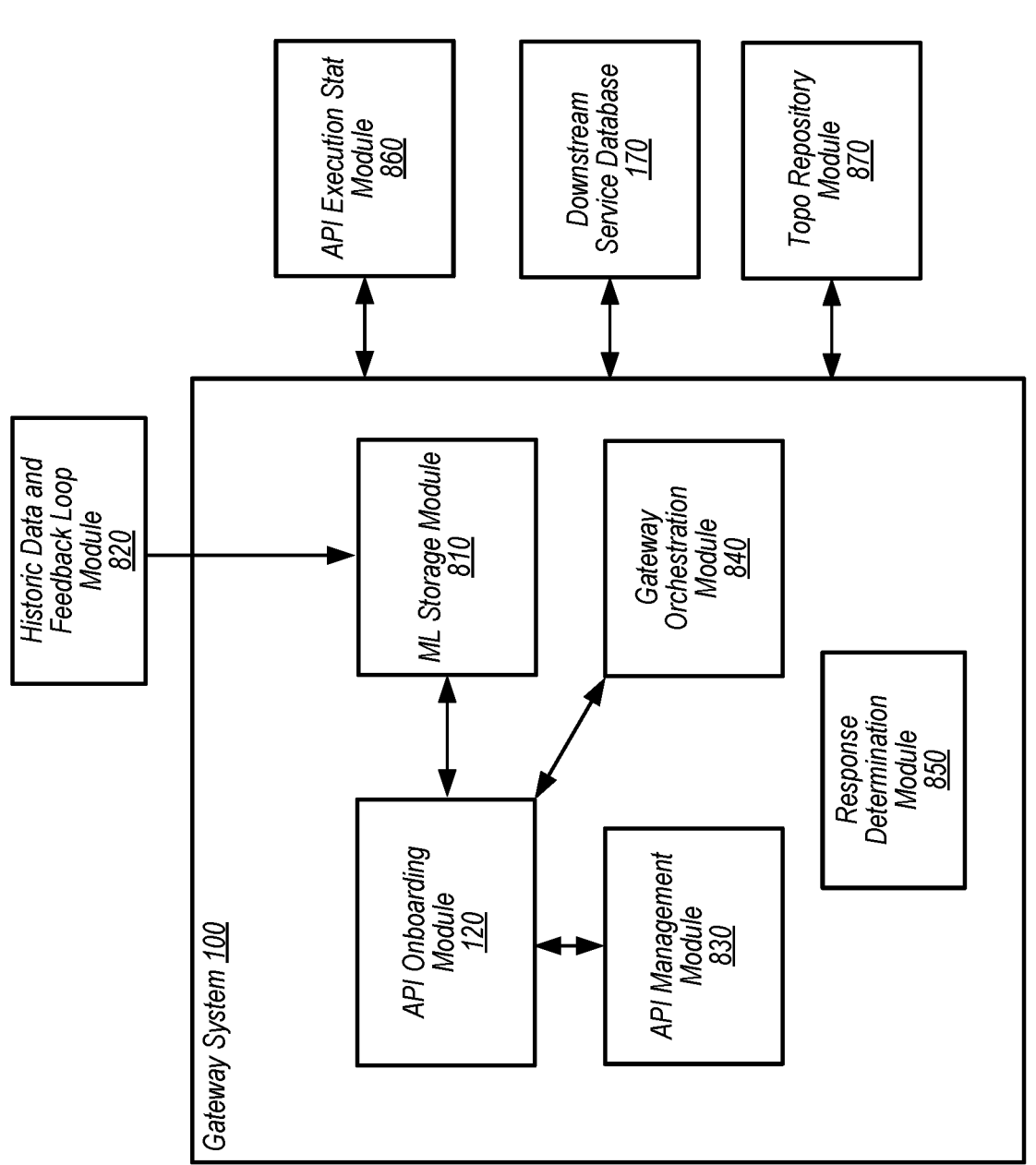
FIG. 8 is a block diagram of a gateway system showing additional elements, according to some embodiments.

FIG. 8 is a block diagram of gateway system 100 showing additional elements, according to some embodiments. In the illustrated embodiment, gateway system 100 includes API onboarding module 120 (described herein), ML (machine learning) storage module 810 (connected to historic data and feedback loop module 820), API management module 830, gateway orchestration module 840, and response determination module 850. Additionally, gateway system 100 is connected to (e.g., interfaces with) API execution stat module 860, downstream service database 170 (described herein), and topo repository module 870. Access to API execution stat module 860 may include information on live execution log history of the various APIs associated with gateway system 100. Topo repository module 870 may include information (e.g., topo tickets) that control the details for connectivity between downstream services and gateway system 100. In some embodiments, information from API execution stat module 860 or topo repository module 870 is usable in finding downstream services for the new service associated with client system 110 (e.g., determining the downstream service sets with confidence scores by downstream service determination module 140, as shown in FIG. 3) in addition to the information accessed from downstream service database 170. Information from API execution stat module 860 may also be usable in determining whether an API exists for a specified set of downstream services (as determined in decision process 600, shown in FIG. 6).

In certain embodiments, ML storage module 810 is connected to API onboarding module 120. ML storage module 810 may be an element storing the various machine learning algorithms implemented by API onboarding module 120. For instance, the various machine learning algorithms associated with expected output object determination module 130 or downstream service determination module 140 may be stored in ML storage module 810. The machine learning algorithms may be accessed as needed by the various modules of API onboarding module 120. In some embodiments, machine learning algorithms in ML storage module 810 are updated through the interface with historic data and feedback loop module 820. Historic data and feedback loop module 820 may, for example, provide continuous learning capabilities for machine learning algorithms in ML storage module 810. For instance, historic data and feedback data may be utilized by the machine learning algorithms for continuous learning by the machine learning algorithms. The historic data and feedback data may be data associated with operation of gateway system 100 or other gateway systems connected to downstream services utilized by gateway system 100.

API management module 830 may manage and control operations of the various APIs implemented in gateway system 100. In some embodiments, as described herein, API management module 830 interfaces with API onboarding module 120 for the implementation of APIs with the new service for client system 110. In various embodiments, gateway orchestration module 840 provides orchestration that identifies downstream services and orchestrates the various calls to the downstream services in response to service requests from client systems. Response determination module 850 may be responsible for determining responses to provide to client systems in response to the service requests. The responses may be determined according to the responses received from the downstream services subsequent to the calls to the downstream services.

Example Methods

FIG. 9 is a flow diagram illustrating a method for generating a new service for a client system, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 610, described below.

At 902, in the illustrated embodiment, a computer system receives a request from a client system to process particular service requests from the client system at a service system in association with downstream services where the request includes information on one or more client system characteristics associated with the particular service requests.

At 904, in the illustrated embodiment, the computer system determines an expected output object for an application programming interface (API) to handle the particular service requests based on the information on the one or more client system characteristics.

At 906, in the illustrated embodiment, the computer system accesses information corresponding to one or more of the downstream services, the information including output schema for the downstream services.

At 908, in the illustrated embodiment, the computer system determines, based on the output schema of the downstream services, at least one set of downstream services capable of providing the expected output object for the API.

At 910, in the illustrated embodiment, the computer system selects a specified set of downstream services from the at least one set of downstream services by applying one or more particular rules.

At 912, in the illustrated embodiment, the computer system implements the API for the client system based on the specified set of downstream services.

Example Computer System

Figure 10:
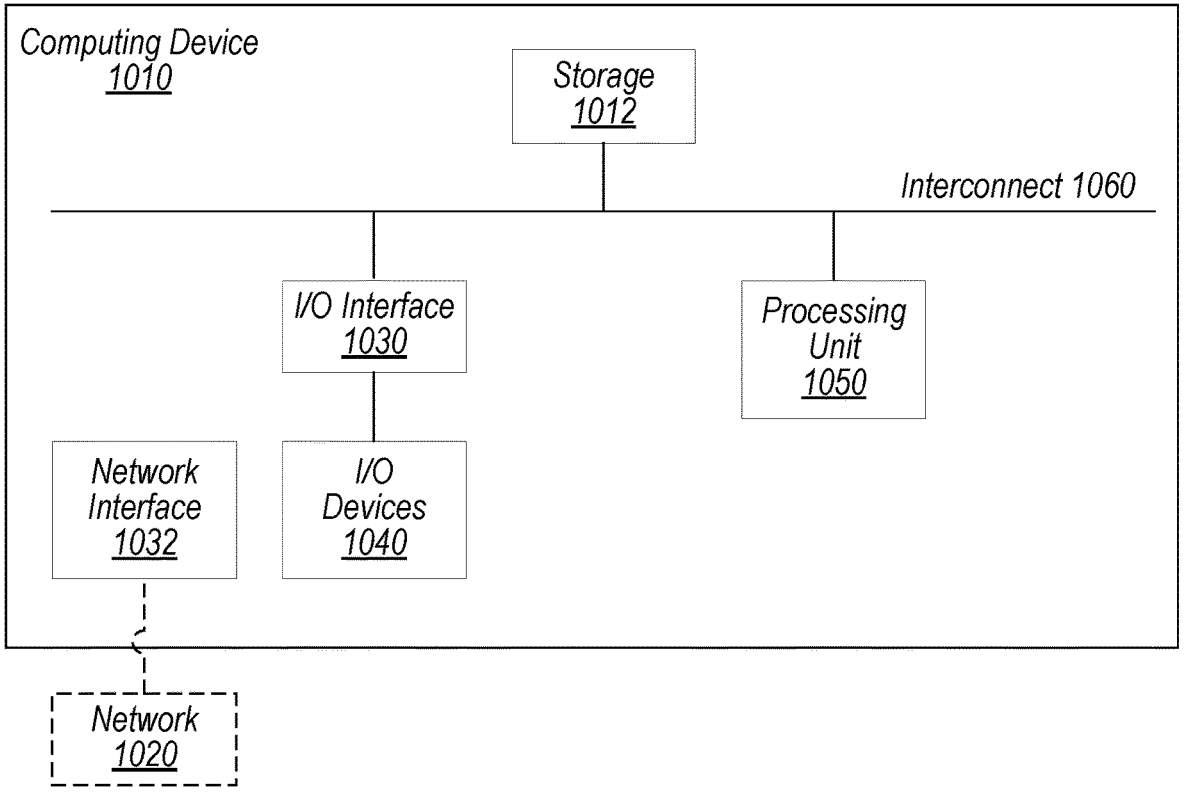
FIG. 10 is a block diagram of one embodiment of a computer system.

Turning now to FIG. 10, a block diagram of one embodiment of computing device (which may also be referred to as a computing system) 1010 is depicted. Computing device 1010 may be used to implement various portions of this disclosure. Computing device 1010 may be any suitable type of device, including, but not limited to, a personal computer system, desktop computer, laptop or notebook computer, mainframe computer system, web server, workstation, or network computer. As shown, computing device 1010 includes processing unit 1050, storage 1012, and input/output (I/O) interface 1030 coupled via an interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

In various embodiments, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within 1050) may contain a cache or other form of on-board memory. In some embodiments, processing unit 1050 may be implemented as a general-purpose processing unit, and in other embodiments it may be implemented as a special purpose processing unit (e.g., an ASIC).

In general, computing device 1010 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 1012 is usable by processing unit 1050 (e.g., to store instructions executable by and data used by processing unit 1050). Storage 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage 1012 may consist solely of volatile memory, in one embodiment. Storage 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In one embodiment, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:

receiving, by a computer system of a service system, a request from a client system to process particular service requests from the client system at the service system in association with downstream services, wherein the request includes information on one or more client system characteristics associated with the particular service requests;

determining, at the computer system, an expected output object for an application programming interface (API) to handle the particular service requests based on the information on the one or more client system characteristics;

accessing, at the computer system, information corresponding to one or more of the downstream services, the information including output schema for the downstream services;

determining, at the computer system and based on the output schema of the downstream services, at least one set of downstream services capable of providing the expected output object for the API, wherein the at least one set of downstream services has a confidence score that satisfies a predetermined threshold, the confidence score being an indication of a predicted confidence that the at least one set of downstream services will provide the expected output object for the API;

selecting, at the computer system, a specified set of downstream services to provide the expected output object for the API from the at least one set of downstream services by applying one or more particular rules; and determining, at the computer system, the API to implement for the client system based on the specified set of downstream services, wherein determining the API to implement includes one of:

identifying an existing API capable of providing the expected output object using the specified set of downstream services; and generating a new API capable of providing the expected output object using the specified set of downstream services.

2. The method of claim 1, wherein determining the at least one set of downstream services capable of providing the expected output object for the API includes:

applying the expected output object for the API and the output schema of the downstream services as inputs to a machine learning algorithm;

obtaining outputs of one or more sets of downstream services capable of providing the expected output object for the API; and selecting as the at least one set of downstream services, one of the one or more sets of downstream services with its confidence score exceeding the predetermined threshold.

3. The method of claim 1, wherein the at least one set of downstream services includes a single downstream service or a combination of multiple downstream services.

4. The method of claim 1, wherein determining the expected output object for the API includes:

applying one or more processing algorithms to the one or more client system characteristics to enrich the system characteristics, at least one processing algorithm being a text processing algorithm; and implementing a machine learning algorithm on the enriched system characteristics to determine the expected output object for the API.

5. The method of claim 1, wherein the one or more client system characteristics include one or more of the following characteristics: sample data available for the particular service requests, service level agreement data for expected responses from the API, expected volume of requests to the API, and an intent for the particular service requests.

6. The method of claim 1, wherein applying the one or more particular rules includes filtering the at least one set of downstream services according to criteria in the particular rules.

7. The method of claim 6, wherein the criteria in the particular rules includes one or more of the following criteria: latency threshold, privacy threshold, and service level agreement data thresholds.

8. The method of claim 1, wherein the generation of a new API for the client system is implemented when the specified set of downstream services includes multiple downstream services.

9. The method of claim 1, wherein the existing API is associated with a single downstream service.

10. The method of claim 1, wherein the API is operable to:

receive service requests from the client system;

transmit requests for output responses to the downstream services in the specified set of downstream services;

receive the output responses from the specified set of downstream services; and transmit the received output responses to the client system.

11. A gateway service system, comprising:

a non-transitory memory; and a processor coupled to the non-transitory memory and configured to read instructions from the non-transitory memory to cause the gateway service system to:

receive a request from a client system to process particular service requests from the client system in association with downstream services of the gateway service system, wherein the request includes information on one or more client system characteristics associated with the particular service requests;

apply at least one first machine learning algorithm to the client system characteristics to determine an expected output object for an application programming interface (API) to handle the particular service requests;

access information corresponding to one or more of the downstream services, the information including output schema for the downstream services;

apply the expected output object for the API and the output schema of the downstream services as inputs to at least one second machine learning algorithm;

select, based on outputs from the at least one second machine learning algorithm, at least one set of downstream services for providing the expected output object for the API, wherein the outputs from the at least one second machine learning algorithm include combinations of one or more downstream services capable of provided the expected output object for the API along with confidence scores for the combinations, the confidence scores being indications of predicted confidences that the combinations of one or more downstream services will provide the expected output object for the API; and apply one or more predetermined rules to the at least one set of downstream services to determine a specified set of downstream services to provide the expected output object for the API from the at least one set of downstream services;

determining a suggested implementation of the API for the client system based on the specified set of downstream services, wherein determining the API to implement includes;

identifying an existing API that is capable of providing the expected output object using the specified set of downstream services; and when the existing API cannot be identified, generating a new API capable of providing the expected output object using the specified set of downstream services;

generating a report on the suggested implementation of the API for the client system; and transmitting the report to the client system for presentation to a user of the client system.

12. The gateway service system of claim 11, wherein the gateway service system selects the at least one set of downstream services based on the confidence score exceeding a predetermined threshold.

13. The gateway service system of claim 11, wherein the predetermined rules include rules that filter the at least one set of downstream services according to criteria.

14. The gateway service system of claim 11, further comprising instructions that cause the gateway service system to receive, from the client system, a response indicating to proceed with implementation of the API in the gateway service system.

15. The gateway service system of claim 11, wherein the report is presented on a user interface of the client system.

16. The gateway service system of claim 11, wherein the suggested implementation of the API in the report includes a recommendation to modify one or more downstream services, or a recommendation for new downstream services.

17. A non-transitory machine-readable medium having stored thereon machine-readable instructions executable to cause a machine to perform operations comprising:

receiving a request from a client system to process particular service requests from the client system in association with downstream services for the service system, wherein the request includes information on one or more client system characteristics associated with the particular service requests;

determining, by implementing a first machine learning algorithm on the information on the one or more client system characteristics, an expected output object for an application programming interface (API) to handle the particular service requests;

accessing information corresponding to one or more of the downstream services, the information including output schema for the downstream services;

determining, by implementing a second machine learning algorithm on the expected output object for the API and the output schema of the downstream services, at least one set of downstream services capable of providing the expected output object for the API, wherein the at least one set of downstream services has a confidence score that satisfies a predetermined threshold, the confidence score being an indication of a predicted confidence that the at least one set of downstream services will provide the expected output object for the API;

selecting a specified set of downstream services to provide the expected output object for the API from the at least one set of downstream services by applying one or more predetermined rules; and determining the API to implement for the client system based on the specified set of downstream services, wherein determining the API to implement includes either:

identification of an existing API capable of providing the expected output object using the specified set of downstream services; or generation of a new API capable of providing the expected output object using the specified set of downstream services when an existing API is not identified.

18. The non-transitory machine-readable medium of claim 17, wherein the machine to perform operations is a gateway service machine for a service system.

19. The non-transitory machine-readable medium of claim 17, wherein the instructions include instructions for the machine to notify the client system of the selection of the specified set of downstream services.

20. The non-transitory machine-readable medium of claim 17, wherein implementing the API for the client system based on the specified set of downstream services include instructions for the machine to:

when the confidence score of the specified set in providing the expected output object for the API is above a second predetermined threshold, implement the downstream services in the specified set without modification; or when the confidence score of the specified set in providing the expected output object for the API is below the second predetermined threshold, modify at least one of the downstream services in the specified set; and implement the specified set with the modified at least one downstream service.

\* \* \* \* \*